A. F. SMITH.
MARINER'S COMPASS.
APPLICATION FILED MAR. 19, 1908.
918,709.  Patented Apr. 20, 1909.
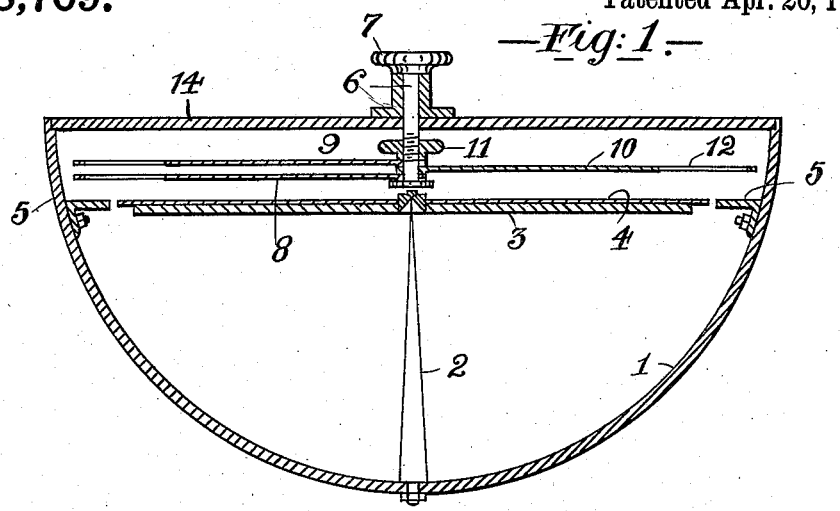
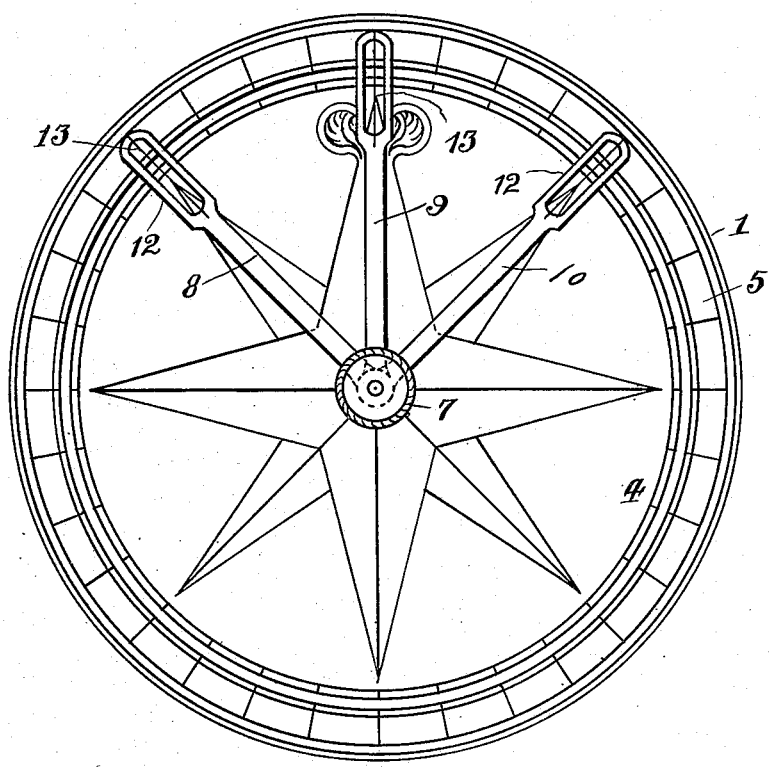
WITNESSES
W. P. Burke
W. H. Kennedy
INVENTOR
Arthur Foster Smith
ATTY.

UNITED STATES PATENT OFFICE.

ARTHUR FOSTER SMITH, OF ALBERT PARK, NEAR MELBOURNE, VICTORIA, AUSTRALIA.

MARINER'S COMPASS.

No. 918,709. Specification of Letters Patent. Patented April 20, 1909.

Application filed March 19, 1908. Serial No. 422,149.

*To all whom it may concern:*

Be it known that I, ARTHUR FOSTER SMITH, a subject of the King of Great Britain, late of 173 Fleet street, London, England, but now residing at 31 Kerferd road, Albert Park, near Melbourne, county of Bourke, and State of Victoria, Commonwealth of Australia, have invented a certain new and useful Improvement in Mariners' Compasses, (for which I have applied for Letters Patent in Great Britain, bearing date the 25th day of March, 1907, but the patent has not yet been granted,) of which the following is a specification.

It is a well known fact that in most cases the needle of a compass does not point to the true north and south, but to some point either on the east or west thereof. This peculiarity is due to what is commonly called the magnetism of the earth and the amount which the needle is deflected is not a known constant even for one place, but varies from time to time, and also from place to place. Thus a mariner's compass is deflected from the true north in varying degrees as the vessel occupies different geographical locations. This deflection is commonly called the "variation". Furthermore the needle when carried at sea is also influenced by the mass of steel or such like magnetic metal, either being part of the ship or cargo approximate to it, which also deflects said needle from the true north and south in varying amounts according to the respective locations of the compass and the metal. This deflection is called deviation. In order therefore for a mariner or other person to ascertain the true north when at sea, it is imperative that he should be able to ascertain what the total error of the compass is at any given time so that he may make allowance therefor, and thus be able to determine the true north whereby he is enabled to steer his vessel on a true and correct course. Hitherto this has been accomplished in two ways. 1. By astronomical observations and subsequent mathematical calculations, and 2. By direct observations of some visible point or points on land. It is very evident that either of these may be almost if not quite impossible at certain times.

This invention has therefore been devised in order to provide a simple apparatus whereby the correct and total deflections of the needle may be readily and simply ascertained at all times.

Referring to the accompanying drawings of which:—Figure 1 is a central vertical section through an ordinary mariner's compass fitted with my improved attachment, and showing the pointers 8 and 9 in the due west, and pointer 10 in the due east position while Fig. 2 is a plan view thereof the pointer 8 is shown at the N. W. position; pointer 9 due north, while pointer 10 is at the N. E. position.

The compass bowl 1 is mounted in any convenient manner and is provided with the usual compass pivot 2 on which is poised the magnetic needle 3 carrying the compass card 4. Approximate to said card 4 is arranged a protractor 5 graduated according to the scale marked on said compass card, *i. e.*, when the card is divided in degrees so also must the protractor be.

Above the card and protractor, and arranged to be centrally true with the pivot 2 of the needle 3 and its card 4, is mounted a rotatable depending shaft 6 provided at its upper end with a milled head 7 to facilitate turning. About the lower end of this shaft 6, one two or three pointers 8, 9 and 10 is or are arranged and each is separately revoluble thereon independent of the other, while a locknut 11 or other convenient arrangement is provided whereby when set the pointers may be locked in any desired relative positions. The outer ends of these pointers 8, 9 and 10 extend over the protractor 5, and each is preferably formed into a loop or eye 12 so that a hair 13 may be radially stretched across same in order to facilitate a more correct reading.

The shaft and its attached parts are preferably mounted in the glass plate 14, which conveniently covers all the main portion of the compass as shown, but it is quite immaterial whether the protractor 5 and the pointers 8, 9 and 10 are above or beneath said glass plate.

The method of using the instrument is as follows: When the vessel is at a wharf or other convenient place where the master knows his exact bearings he can determine to a nicety. 1. The magnetic bearing of the ship's head, and 2. The actual true bearing of the ship's head, which of course give the "Error". This having been accomplished the pointers 8, 9 and 10 are moved to the following positions on the protractor 5, namely. 8 to the ship's head. 9 to the magnetic north and 10 to the true north. The nut 11 is then tightened and the pointers locked in their respective positions so that they cannot move individually independent of each other, but can be readily rotated in a body by operating the milled head 7. Let us now take the following hypothetical case in order to better understand the method. The ship's head is pointing magnetic north 45° west and true north is magnetic north 45° east, or showing an error of 45° west. We now find when the pointers 8, 9 and 10 are placed in their correct positions that they are respectively 45° apart, 8 and 10 forming a right angle with the magnetic needle and its respective pointer 9 midway between them. The ship now continues her course and on the compass being read it is found that she has moved to 90° west (magnetic), i. e., the direction has apparently undergone an alteration of 45° west. The milled head 7, and with it the pointers are now turned backward to the north through 45°, which are calculated on the protractor 5. Now if during this movement of the ship the original error of 45° west has been increased or decreased it will be found that the three pointers do not regain their respective positions with regard to the divisions on the protractor 5 and those on the card 4. This alteration can be directly read and from this difference of the relative positions the total error can be readily calculated and the approximate true north determined.

In the event of less than three pointers being used it will be necessary to mark down or remember one or more of the original and subsequent readings for comparison, whereas when the three pointers are used as illustrated, the relative readings are always apparent and consequently it is preferable to so construct the apparatus.

Having now described my invention what I claim as new and desire to secure by Letters Patent is:—

In an apparatus as described revoluble pointers arranged on a rotatable shaft so that each may move independently of the other, or others and means for locking same in any desired relative positions substantially as described.

In testimony whereof I have hereunto set my hand this eighth day of November one thousand nine hundred and seven in the presence of two subscribing witnesses.

ARTHUR FOSTER SMITH.

Witnesses:
ALBERT E. B. SWANSON,
CHARLES HARKELL.